United States Patent [19]
Walther

[11] 4,129,336
[45] Dec. 12, 1978

[54] BASE FLANGED TIRE CARRYING RIM AND WHEEL

[75] Inventor: William D. Walther, Kettering, Ohio

[73] Assignee: Dayton-Walther Corporation, Dayton, Ohio

[21] Appl. No.: 749,243

[22] Filed: Dec. 13, 1976

Related U.S. Application Data

[63] Continuation-in-part of Ser. No. 592,502, Jul. 9, 1975, abandoned.

[51] Int. Cl.² .............................................. B60B 23/10
[52] U.S. Cl. .............................. 301/12 R; 301/13SM; 301/20
[58] Field of Search ............. 301/10 R, 11 R, 11 CD, 301/12 R, 13 R, 13 SM, 19–20, 22, 35 SS, 35 SL, 96–97; 152/396–398, 406–410

[56] References Cited
U.S. PATENT DOCUMENTS

| | | | |
|---|---|---|---|
| 1,702,377 | 2/1929 | Booth | 301/19 |
| 1,837,694 | 12/1931 | Walther | 301/12 R |
| 2,019,145 | 10/1935 | Le Jeune | 301/11 X |
| 2,241,839 | 5/1941 | Woodward | 301/12 R |
| 2,270,918 | 1/1942 | Ash | 301/13 R |
| 2,450,507 | 10/1948 | Flogaus | 301/13 R X |
| 2,633,388 | 3/1953 | Woodward | 301/12 R |
| 3,675,974 | 7/1972 | Durham | 301/13 SM |

FOREIGN PATENT DOCUMENTS 774116 9/1934 France ................................. 301/13 MS

*Primary Examiner*—Robert B. Reeves
*Assistant Examiner*—Charles A. Marmor
*Attorney, Agent, or Firm*—Mack D. Cook, II

[57] ABSTRACT

Tire carrying rims seated and locked on vehicle wheels by fastening assemblies or means. A wheel has spoke members with dimensioned felloe surfaces for mating engagement with coacting surfaces on radially inwardly projecting mounting flanges integrally attached to and mounted beneath a base portion of the rims between the bead flanges. Rims may be single or dual mounted in mating, seating or full surface engagement with coacting felloe surfaces of the rim and wheel by full tightening of the fastening assemblies or fastening means.

4 Claims, 10 Drawing Figures

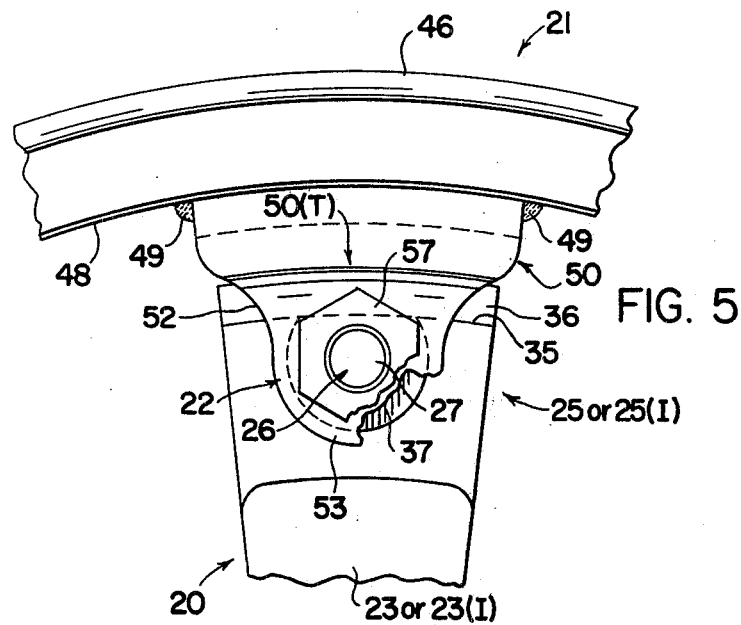
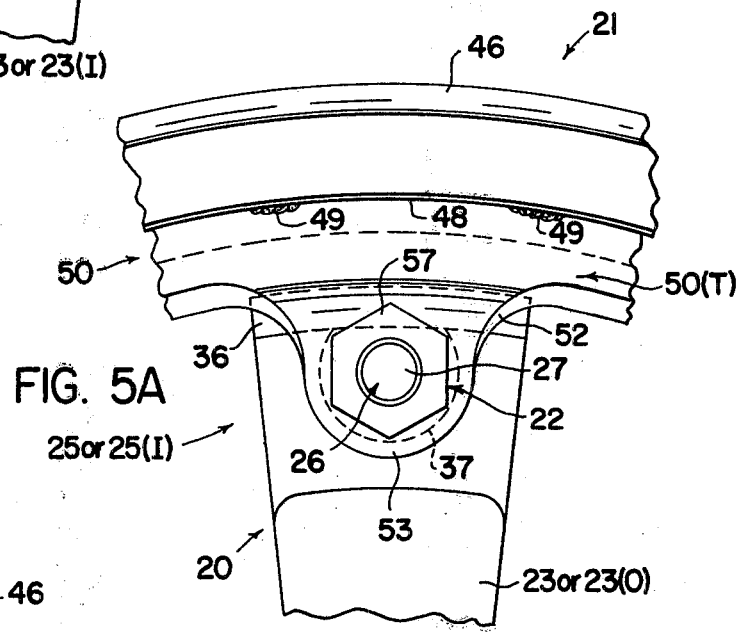
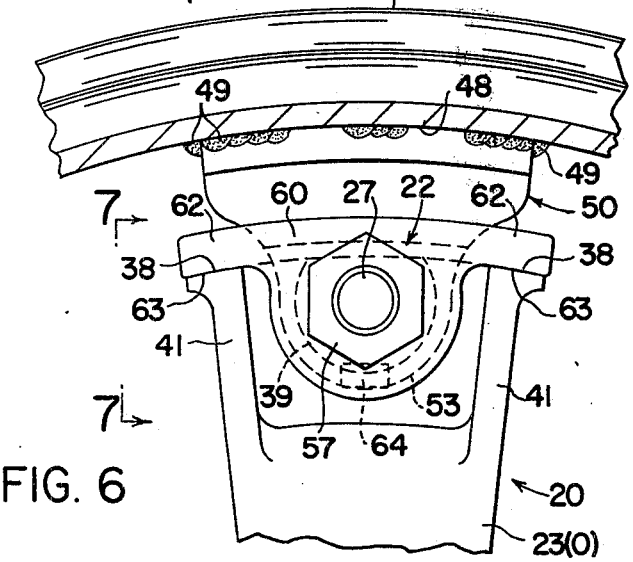
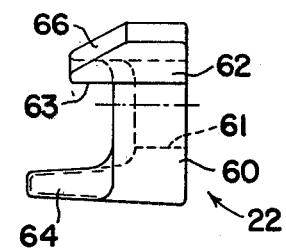

BASE FLANGED TIRE CARRYING RIM AND WHEEL

This application is a continuation-in-part of U.S. application Ser. No. 592,502, filed July 9, 1975, now abandoned.

BACKGROUND OF THE INVENTION

The present invention relates to a combination of at least one tire carrying rim seated and locked by fastening assemblies or means on a vehicle wheel. A combination of dual inner and outer tire carrying rims may be mounted on a vehicle wheel without using a separating means, such as an annular spacer.

The spoke members of a single wheel and the inner spoke members of a dual wheel have a felly, felloe or load-bearing portion with a radially inclined outer surface adjacent to a radially directed inner surface.

The outer spoke members of a dual wheel have a felly, felloe or load-bearing portion with radially outer dual axially oriented surfaces and a radially directed surface extending inwardly between the axially oriented surfaces.

In several embodiments, a rim, whether mounted as a single, inner dual or outer dual, may be of an identical and, therefore, interchangeable construction. The rims have radially outwardly directed bead flanges and radially inwardly projecting mounting flanges. The mounting flanges are integrally attached to and mounted beneath a rim portion between the bead flanges and have a medial portion comprising a radially inclined surface, a transitional portion and a radially directed terminal portion.

An initial tightening of the fastening assemblies or means for a single or dual wheel will seat the radially inclined mounting flange surfaces in concentric radial registry with the radially outer surfaces on the spoke members. Thereafter, the seated rims will be locked on the spoke members, in axial and radial alignment and registry, by further tightening of the fastening assemblies or means against the terminal portion of each rim mounting flange and the full surface engagement thereof with a radially directed wheel felloe surface. The mounting flanges are proportioned or dimensioned such that during final tightening, a fastening assembly or means will elastically stress or minutely deform the mounting flange medial, transitional and terminal portions relative to the plane of the radially directed wheel felloe surfaces to provide the full axial and radial alignment and registry of rim to wheel.

The prior art relating to tire carrying rims demountably carried on vehicle wheels includes patents to be found in Class 301 beginning with Subclasses 10 R. Other relevant patents may be found in Class 152, Subclasses 406 X et seq.

The accurate mounting of tire carrying rims on the felloe, felly or load-bearing portion of a wheel has long been a problem in the art. Vehicle operations and industry regulations seek longer tire life and complete safety in operation, even under the most severe of vehicle operating conditions. The tire manufacturers are endeavoring to provide tires which have optimum performance characteristics, including lateral and radial balance. Consequently, it is being required that this art provide elements, the wheels, the rims, and fastening assemblies or means therefor, which do not deteriorate, hinder or impair the projected performance characteristics of the tires.

Heretofore, the spoked wheel structure of a tire-rim-wheel assembly has been regarded primarily as a load carrying element attached to an axle of the vehicle and carrying the rim. The periphery of the wheel had felly surfaces to pilot or guide the rim into approximate mounting position. Thereafter, fastening assemblies or means were torqued down or tightened in such a manner that the tire carrying rim would not come loose from the wheel during use. If done correctly, as by an expert and conscientious mechanic, the prior art rim mounting techniques would not deteriorate, hinder or impair the performance characteristics of the tires. However, environmental or extrinsic factors such as warpage, deformation or damage to the rim and spacer or wear of the fastening assemblies or means could lead to relative displacement or non-alignment of the assembly components during fastening, creating conditions of what are now commonly referred to as excessive lateral (axial) or radial runout, or an imbalance of the tire-rim-wheel assembly during vehicle operation.

The concepts of the invention provide wheel spoke members with proportioned or dimensioned felloe surfaces for mating, seating or full surface engagement with coacting surfaces on the rim mounting flange medial and terminal portions by full tightening of the fastening assemblies.

A rim with a mounting flange and fastening assemblies or means therefor according to the invention, when used with wheels adapted thereto, positively controls and reduces lateral (axial) and radial runout, resists rim warpage or deformation, restricts rim rotation relative to the wheel and provides better balance for the tire-rim-wheel assembly during vehicle operation.

SUMMARY OF THE INVENTION

The object of the invention is to provide an improved combination of a tire carrying rim seated and locked by fastening assemblies or means on a vehicle wheel.

It is a further object of the invention to provide rims with radially inwardly projecting mounting flanges integrally attached to and mounted beneath a base portion of the rims between the bead flanges, the mounting flanges having radially inclined outer surfaces adjacent to radially directed terminal portions which are mounted on the spoke members of a wheel having coacting felloe surfaces by the tightening of fastening assemblies or means.

It is a further object of the invention to provide a combination of a tire carrying rim seated and locked by fastening assemblies on a vehicle wheel which positively controls and reduces lateral (axial) and radial runout, resists rim warpage or deformation, restricts rim rotation relative to the wheel and provides better balance for the tire-rim-wheel assembly during vehicle operation.

These and other objects of the invention, as well as the advantages thereof, will be apparent in view of the detailed description of the various embodiments thereof as set forth below.

In general, an improved dual wheel according to the invention has a plurality of inner and outer spoke members. Each of the inner spoke members has a felloe comprising a radially inclined outer surface and an adjacent radially directed surface extending inwardly substantially perpendicular to the rotational axis of said wheel and providing a mounting location for an axially projecting component of a fastening assembly or means. Each of the outer spoke members has a felloe comprising radially outer spaced-outer axially projecting wing portions providing outwardly facing dual axially oriented surfaces and a radially directed surface oriented transversely between the axially oriented surfaces substantially perpendicular to the rotational axis of the wheel and providing a mounting location for an axially projecting component of a fastening assembly.

In general, a single wheel according to the invention has a plurality of spoke members. Each spoke member has a felloe comprising a radially inclined outer surface and an adjacent radially directed surface extending inwardly in a plane substantially perpendicular to the rotational axis of the wheel and providing a mounting location for the axially projecting component of a fastening assembly or means.

In general, a tire carrying rim according to the invention has radially outwardly directed bead flanges and radially inwardly projecting mounting flanges with surfaces for registry with the radially outer felloe surfaces of the wheel spoke members. A mounting flange is integrally attached to and mounted beneath a conforming annular surface on a rim base portion between the bead flanges. The medial portion of a mounting flange comprises a radially inclined surface, the terminal portion of a mounting flange being radially directed and having a bore therein for receiving an axially projecting component of a fastening assembly or means. A medial portion and a terminal portion of each mounting flange are functionally connected by a transitional portion. The mounting flanges are proportioned or dimensioned such that during final tightening of a fastening means or assembly, the medial, transitional and terminal portions will be placed under load and thereby elastically stressed or minutely deformed relative to the plane of a radially directed wheel felloe surface in full surface engagement with the terminal portion of each mounting flange.

In general, each fastening assembly or means for mounting a single rim or an inner dual rim will comprise a threaded fastener having a rotatable element for bearing engagement against the terminal portion of each rim mounting flange.

In general, each fastening assembly for mounting an outer dual rim will have a threaded fastener and a clamp element supported thereon. Each clamp element will have lateral wing portions for mating engagement with the outwardly facing felloe surfaces, an axially inwardly directed member for mating engagement with the terminal portion of each rim mounting flange, and a radially outer portion with a radially inclined surface for mating engagement with a radially inclined surface on the mounting flange.

According to the invention, a single or inner dual tire carrying rim is seated on, and thereafter locked on, a wheel by initial and final tightening of fastening assemblies against each rim mounting flange terminal portion. During initial tightening of the fastening assemblies, the radially inclined mounting flange surfaces will seat in concentric radial registry with the radially inclined outer wheel felloe surfaces. Final tightening of the fastening assemblies to apply a load will lock the rim on the wheel, in axial and radial alignment and registry relative to the rotational axis of rim and wheel, by the full surface engagement of the mounting flange terminal portions with the radially directed wheel felloe surfaces and the elastic deformation of the mounting flange medial, transitional and terminal portions relative to the substantially perpendicular plane of the radially directed wheel felloe surfaces.

According to the invention, an outer dual tire carrying rim is seated on, and thereafter locked on, a wheel by initial and final tightening of fastening assemblies against each rim mounting flange terminal portion. During initial tightening of the fastening assemblies, the radially inclined mounting flange surfaces will seat in concentric radial registry with the radially inclined surfaces on the radially outer clamp element portions, the lateral wing clamp element portions being in mating engagement with the outwardly facing dual axially oriented wheel felloe surfaces. Final tightening of the fastening assemblies to apply a load will lock the rim on the wheel, in axial and radial alignment and registry relative to the rotational axis of rim and wheel, by the full surface engagement of the mounting flange terminal portions with the radially directed wheel felloe surfaces and the elastic deformation of the mounting flange medial, transitional and terminal portions relative to the substantially perpendicular plane of the radially directed wheel felloe surfaces.

DESCRIPTION OF THE DRAWINGS

FIG. 5 is a fragmentary front elevation, taken substantially as indicated on line 5—5 of FIG. 3;

FIG. 5A is a modified front elevation, taken substantially as indicated on line 5A—5A of FIG. 3, showing yet another form of tire carrying rim;

FIG. 6 is a fragmentary front elevation, taken substantially as indicated on line 6—6 of FIG. 4;

FIG. 7 is a detached view of a clamp element, taken substantially as indicated on line 7—7 of FIG. 6;

DETAILED DESCRIPTION OF THE INVENTION

Figure 1:
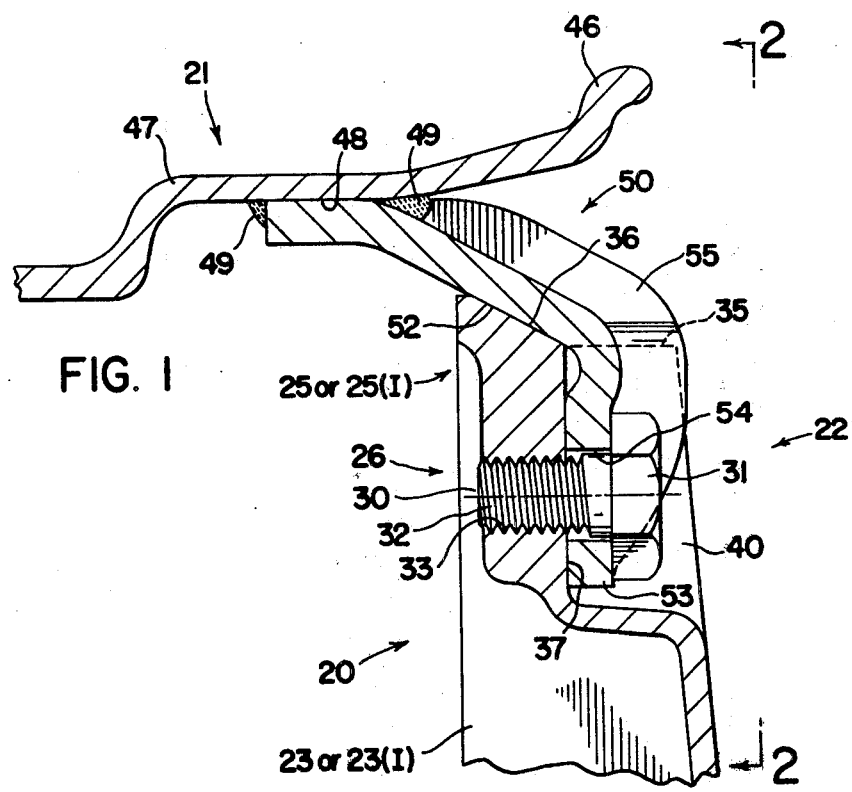
FIG. 1 is a sectional view of a combination of a tire carrying rim seated and locked by a fastening means on a wheel felloe according to the invention, taken substantially as indicated on line 1—1 of FIG. 2.

A wheel for use with a tire carrying rim according to the invention is referred to generally by the numeral 20. A tire carrying rim according to the invention is referred to generally by the numeral 21. The fastening means or assemblies which are tightened for seating and locking a rim 21 are referred to generally by the numeral 22.

In general, a wheel 20 for mounting a tire carrying rim 21 has a plurality of spaced-apart spoke members 23 extending radially from a conventional hub area (not shown) adapted for attachment of the wheel to a vehicle axle (not shown). On a wheel 20 for mounting dual inner and outer rims 21, the inner spoke members are indicated by 23(I) and the outer spoke members by 23(O).

Each spoke member 23 terminates in a felloe, felly or load-bearing portion referred to generally by the numeral 25. On a wheel 20 for mounting dual rims 21, the inner felloes are indicated by 25(I) and the outer felloes by 25(O).

Each wheel felloe 25 has a predetermined mounting location indicated generally at 26 for the axially projecting component of a fastening means or assembly 22.

Figure 4:
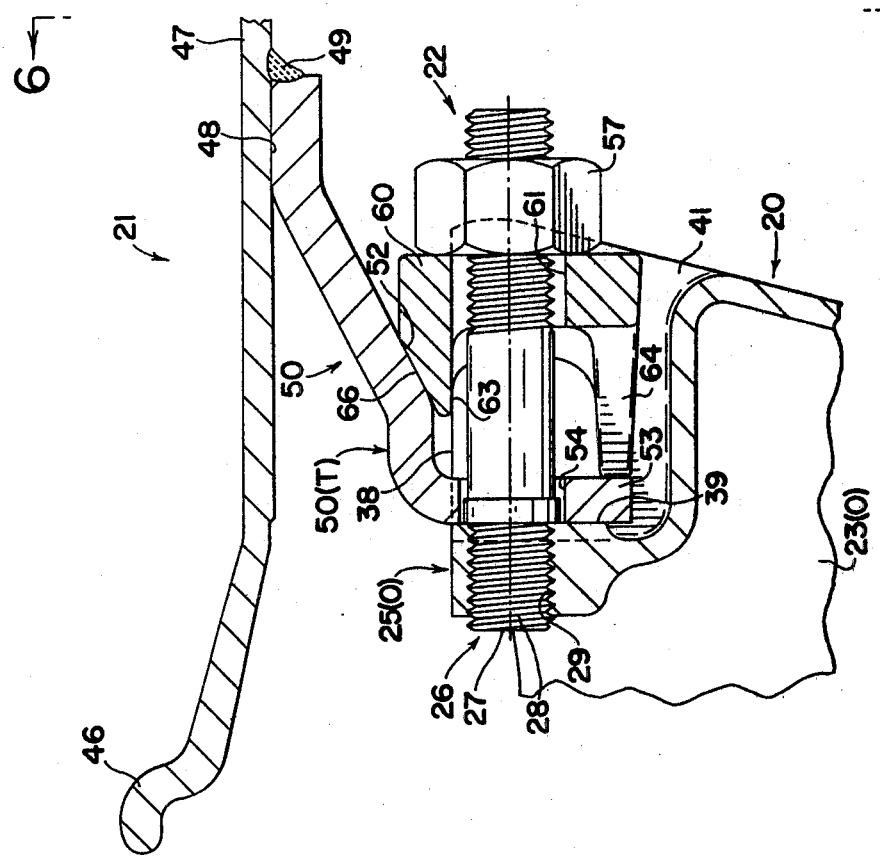
FIG. 4 is a sectional view of a combination of the tire carrying rim of FIG. 3 seated and locked by a fastening assembly on yet another form of wheel felloe according to the invention.

A fastening assembly 22 is used when mounting a rim 21 on the felloe 25(O) of an outer spoke member 23(O) of a dual wheel. As shown in FIG. 4, the axially projecting component of a fastening assembly 22 attached to the felloe portion 25(O) at a mounting location 26 is an elongated stud 27 having an inner end with peripheral threads 28 for mating engagement with bore threads 29 and carrying a rotatable nut. Alternatively, the studs 27 may be attached to the felloe portions 25(O) at a mounting location 26 as by a conventional arc stud or capacitor-discharge welds.

Figure 3:
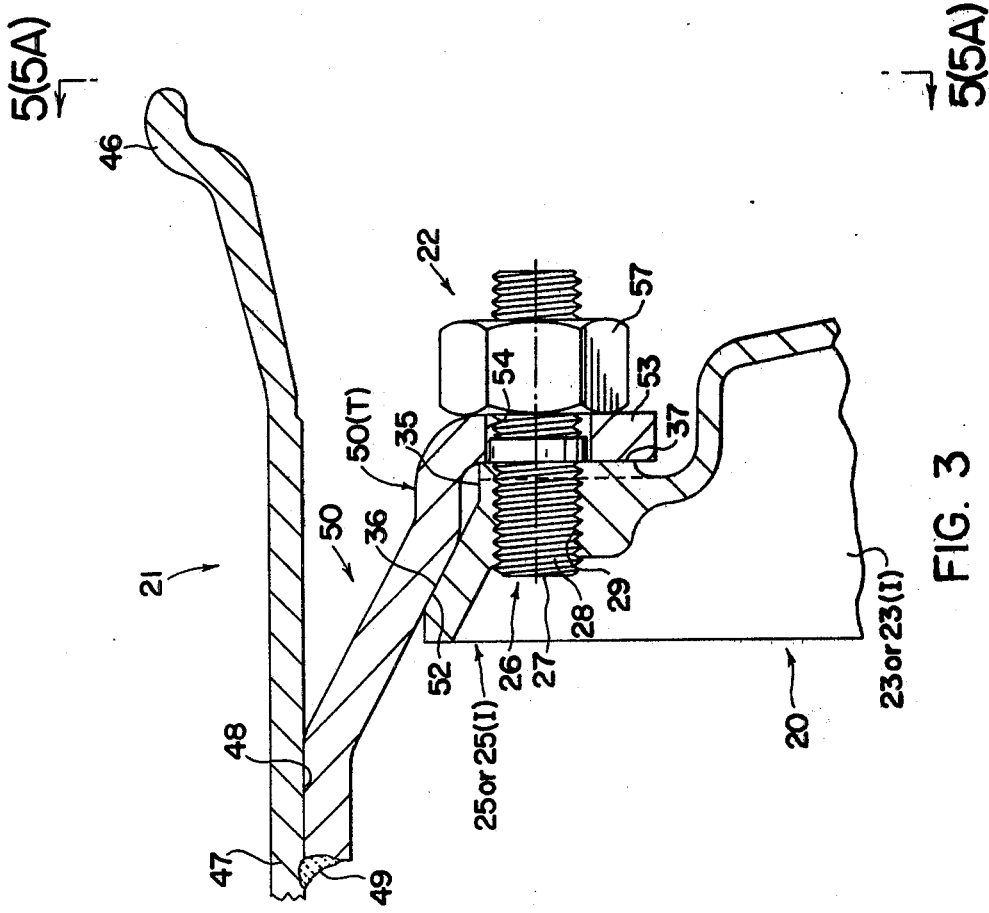
FIG. 3 is a sectional view of a combination of another form of tire carrying rim seated and locked by a fastening assembly on another form of wheel felloe according to the invention.
Figure 8:
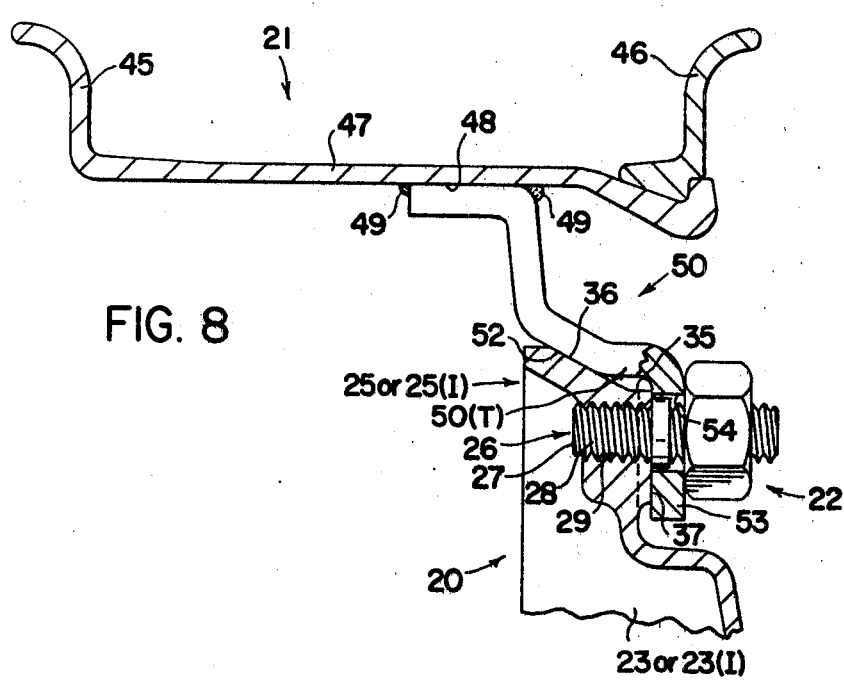
FIG. 8 is a sectional view of a flat base tire carrying rim according to the invention.

A fastening means or a fastening assembly may be used when mounting a rim 21 or a felloe 25(I) of an inner spoke member of a dual wheel or a felloe 25 on a spoke member of a single wheel. As shown in FIG. 1, the axially projecting component of a fastening means 22 attached to the felloe portion 25(I) or 25 at a mounting location 26 is the shank 30 of a cap head bolt 31 having peripheral threads 32 for mating engagement with the bore threads 33. As shown in FIG. 3, 8 and 11, the axially projecting component of a fastening assembly 22 may be an elongated stud 27 having an inner end with peripheral threads 28 for mating engagement with bore threads 29 and carrying a rotatable nut.

In the embodiments of FIGS. 1, 3 and 8, the felloe portions 25 or 25(I) have an axially oriented surface 35 intersecting a radially inclined surface 36. A radially directed surface 37 extends inwardly away from a surface 35. Each surface 37 has a mounting location 26 for the axially projecting component of a fastening means or fastening assembly 22 and is substantially perpendicular to the rotational axis of a wheel 20.

Figure 2:
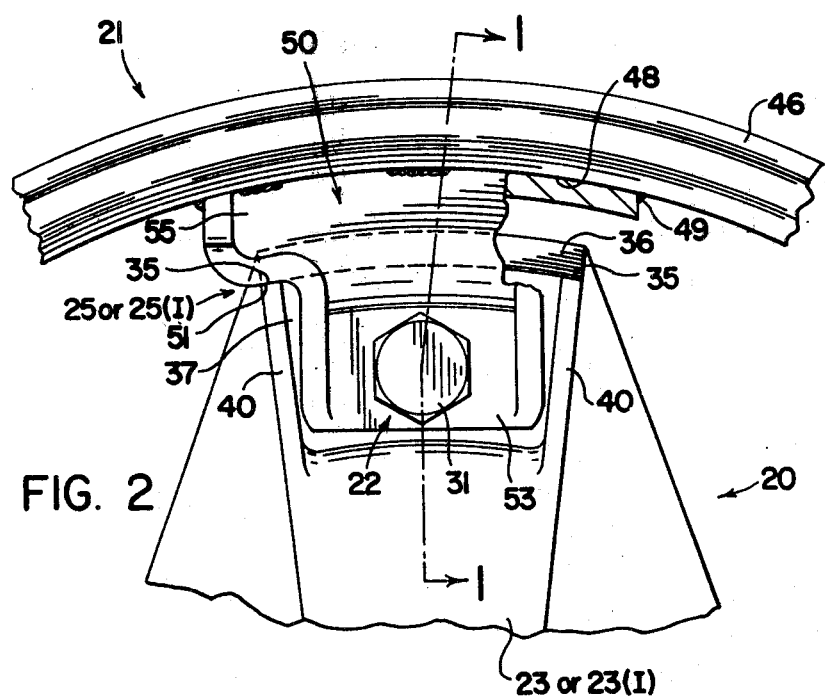
FIG. 2 is a fragmentary front elevation, partially broken away, taken substantially as indicated on line 2—2 of FIG. 1.

As best shown in FIG. 2, a felloe portion 25(I) or 25 may have spaced-apart axially projecting wing portions 40 providing outwardly facing dual axially oriented surfaces 35. Alternatively, as shown in FIGS. 3 and 8, a felloe portion 25(I) or 25 may have a single axially oriented surface 35 extending substantially the width of the felloe portion.

As shown in FIG. 6, a felloe portion 25(O) has spaced-apart axially projecting wing portions 41 providing outwardly facing dual axially oriented surfaces 38.

A tire carrying rim 21 has dual bead flanges 45 (see FIG. 8) and 46 for seating the beads (not shown) of a tire in a conventional manner. The bead flanges 45 and 46 are radially outwardly directed from an annular rim base or medial portion 47. The medial rim base portion 47 has a conforming annular surface 48 for integral attachment thereto, as by welds 49, of the radially outer end of radially inwardly projecting mounting flanges referred to generally by the numeral 50.

A radially inwardly projecting rim mounting flange 50 has a medial or body portion with a radially inclined surface 52. As shown in FIGS. 1, 3, 4 and 8, the radially inwardly facing flange surface 52 may conform to and be seated on the radially outer surface 36 on a wheel felloe 25 or 25(I) or, as shown in FIG. 4, and as described in further detail below, the flange surface 52 may conform to and be seated on radially outer surfaces on stud supported clamp elements of the fastening assemblies 22.

The terminal portion 53 of each mounting flange 50 is radially directed substantially perpendicular to the rotational axis of a rim 21 and has a bore 54 therein for receiving the axially projecting component 27 or 30 of a fastening assembly of fastening means 22.

The medial portion and terminal portion of each mounting flange 50 are functionally connected by a transitional portion, as indicated generally at 50(T).

Referring to FIGS. 1 and 2, a rim flange 50 may have lateral portions 55 formed integrally with the terminal portion 53 providing inwardly facing dual axially oriented surfaces 51 for seating on the conforming dual wheel felloe surfaces 35.

Also, as shown in FIG. 1, the terminal portion 53 of the rim flange 50 is in mating or full surface engagement with a radially directed surface 37 on a wheel felloe portion 25 or 25(I).

Referring to FIG. 3, the terminal portion 53 of the mounting flange 50 is locked into full surface engagement with a radially directed suface 37 on a wheel felloe portion 25 or 25(I) by final tightening of a nut 57 rotatably mounted on the stud threads 28.

Referring to FIG. 4, a fastening assembly 22 comprises an elongated stud 27, a clamp element 60 and a rotatable nut 57 threaded on the stud 27. Referring also to FIG. 7, a clamp element 60 has a bore 61 for receiving the stud 27. A clamp element 60 also has lateral wing portions 62 providing downwardly facing dual axial oriented surfaces 63 for seating on conforming wheel felloe surfaces 38. A clamp element also preferably has an axially inwardly directed lower leg portion 64 for mating engagement against a flange terminal portion 53. The radially outer portion of a clamp element 60 has a radially inclined surface 66 for mating engagement with conforming flange surface 52. The terminal portion 53 of the mounting flange 50 is locked into full surface engagement with a radially directed surface 39 on a wheel felloe portion 25(O) by tightening of a nut 57 rotatably threaded on a stud 27.

Referring to FIG. 8, a rim 21 may be a flat base rim having a fixed bead flange 45 and a removable bead flange 46. The terminal portion 53 of the mounting flange 50 is locked into full surface engagement with a radially directed surface 37 on a wheel felloe portion 25 or 25(I) by final tightening of a nut 57 rotatably mounted on the stud threads 28.

Figure 9:
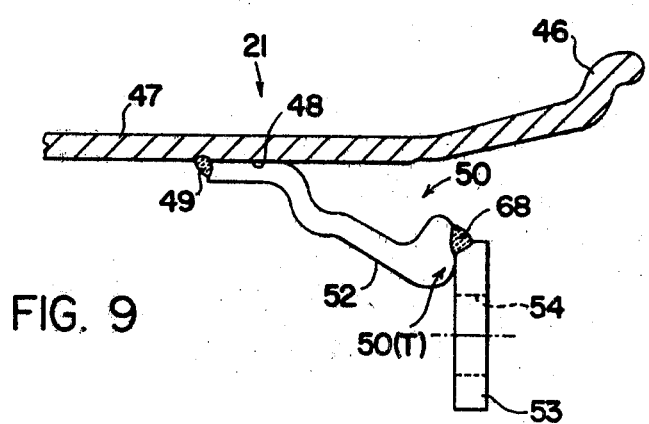
FIG. 9 is a sectional view of still another form of tire carrying rim according to the invention.

Referring to FIG. 9, a rim 21 may have a mounting flange 50 with the transitional portion 50(T) having attached thereto, as by a weld 68, a flange terminal portion 53.

Other than FIGS. 1 and 2, all other embodiments of a rim 21, as disclosed herein, may have a mounting flange 50 which is an annular or circumferentially continuous element, see FIG. 5A. In this form, a mounting flange 50 would have the surface 52, the terminal portion 53 and the transitional portion 50(T) thereon, and the bores 54 therein at spaced intervals.

In all embodiments of the rim 21, as disclosed herein, the radially inclined rim mounting flange surface 52 has a suitable angle relative to the rotational axis of the rim to provide a conical surface for mating engagement with either a wheel felloe surface 36 or surface 66 on the clamp elements 60. In the embodiment of FIGS. 1 and 2, the dual axially oriented surfaces 51 extend substantially parallel to the rotational axis of the rim 21.

What is claimed is:

1. A combination of dual inner and outer tire carrying rims seated and locked by fastening means and assemblies on a vehicle wheel, said wheel having a plurality of inner and outer spoke members, each of said inner spoke members having a felloe comprising axially oriented and radially inclined surfaces and a radially directed surface extending inwardly from each of said axially oriented surfaces substantially perpendicular to the rotational axis of said wheel and providing a mounting location for an axially projecting component of said inner rim fastening means, each of said outer spoke members having a felloe comprising spaced-apart axially projecting wing portions providing outwardly facing dual axially oriented surfaces and a radially directed surface oriented transversely between said axially oriented surfaces substantially perpendicular to the rotational axis of said wheel and providing a mounting location for an axially projecting component of said outer rim fastening assemblies, each of said rims having radially outwardly directed bead flanges and radially inwardly projecting mounting flanges, each of said mounting flanges having a radially outer portion, a medial portion, a transitional portion and a radially inner terminal portion, said radially outer flange portion being integrally attached to and mounted beneath a conforming annular surface on a base portion of said rim at a predetermined axial location between said bead flanges, said medial portion of said mounting flange being connected to said radially outer portion and directed inwardly away from said rim and comprising a radially inclined surface, said transitional portion of said mounting flange being functionally connected between said medial and terminal portions, said terminal portion of said mounting flange being radially directed, said terminal portion of a mounting flange on said inner rim having a bore therein for receiving said axially projecting component of said inner rim fastening means, said terminal portion of a mounting flange on said outer rim having a bore therein for receiving said axially projecting component of said outer rim fastening assemblies, each of said outer rim fastening assembly comprising a threaded fastener and a clamp element supported by said threaded fastener, each said clamp element having lateral wing portions providing downwardly facing dual axially oriented surfaces, an axially inwardly directed member and a radially outer portion comprising a radially inclined surface, whereby, said inner rim is seated on, and thereafter locked on, said inner spoke members by tightening of said inner rim fastening means and the mating engagement of said radially inclined surface on each said inner spoke felloe with said radially inclined surface on each said inner rim mounting flange and by the mating engagement of said radially directed surface on each said inner spoke felloe with said terminal portion of each said inner rim mounting flange, and, whereby, said outer rim is seated on, and thereafter locked on, said outer spoke members by tightening of said outer rim fastening assemblies and the mating engagement of said radially directed surface on each said outer spoke felloe with said terminal portion of each said outer rim mounting flange, and by the mating engagement of said radially inclined surface on each said outer rim mounting flange with said radially inclined surface on said radially outer portion of each said clamp element of each said fastening assembly, said downwardly facing dual axially oriented surfaces on said lateral wing portions of each said clamp element being in mating engagement with said outwardly facing dual axially oriented surfaces on each said outer spoke felloe and said axially inwardly directed member of each said clamp element being in mating engagement with said terminal portion of each said outer rim mounting flange.

2. A combination of dual inner and outer tire carrying rims mounted on a vehicle wheel, said outer rim being seated and locked on said wheel by fastening assemblies, said wheel having a plurality of inner and outer spoke members, each of said outer spoke members having a felloe comprising spaced-apart axially projecting wing portions providing outwardly facing dual axially oriented surfaces and a radially directed surface oriented transversely between said axially oriented surfaces substantially perpendicular to the rotational axis of said wheel and providing a mounting location for an axially projecting component of said fastening assemblies, said outer rim having radially outwardly directed bead flanges and radially inwardly projecting mounting flanges, each of said mounting flanges having a radially outer portion, a medial portion, a transitional portion and a radially inner terminal portion, said radially outer flange portion being integrally attached to and mounted beneath a conforming annular surface on a base portion of said rim at a predetermined axial location between said bead flanges, said medial portion of said mounting flange being connected to said radially outer portion and directed inwardly away from said rim and comprising a radially inclined surface, said transitional portion of said mounting flange being functionally connected between said medial and terminal portions, said terminal portion of said mounting flange being radially directed and having a bore therein for receiving said axially projecting component of said fastening assemblies, each said fastening assembly comprising a threaded fastener and a clamp element supported by said threaded fastener, each said clamp element having lateral wing portions providing downwardly facing dual axially oriented surfaces, an axially inwardly directed member, and a radially outer portion comprising a radially inclined surface, whereby, said outer rim is seated on, and thereafter locked on, said outer spoke members by tightening of said fastening assemblies and the mating engagement of said radially directed surface on each said outer spoke felloe with said terminal portion of each said outer rim mounting flange, and by the mating engagement of said radially inclined surface on each said outer rim mounting flange with said radially inclined surface on said radially outer portion of each said clamp element of each said fastening assembly, said downwardly facing dual axially oriented surfaces on said lateral wing portions of each said clamp element being in mating engagement with said outwardly facing dual axially oriented surfaces on each said outer spoke felloe and said axially inwardly directed member of each said clamp element being in mating engagement with said terminal portion of each said outer rim mounting flange.

3. In the combination of claim 2, an outer rim wherein said rim has a mounting flange with said radially outer portions being a circumferentially continuous element having said medial portions with said radially inclined surfaces, said transitional portions and said terminal portions thereon, and said bores therein at spaced intervals.

4. A combination of a tire carrying rim seated and locked by fastening means on a vehicle wheel, said wheel having a plurality of spoke members, each of said spoke members having a felloe comprising spaced-apart axially projecting wing portions providing outwardly facing dual axially oriented surfaces and an intersecting radially inclined surface and a radially directed surface extending inwardly away from said dual axially oriented surfaces substantially perpendicular to the rotational axis of said wheel and providing a mounting location for an axially projecting component of said fastening means, said rim having radially outwardly directed bead flanges and radially inwardly projecting mounting flanges, each of said mounting flanges being integrally attached to and mounted beneath a conforming annular surface on a base portion of said rim between said beam flanges, the medial portion of said mounting flange comprising a radially inclined surface, the terminal portion of said mounting flange being radially directed and having a bore therein for receiving said axial projecting component of said fastening means, said terminal portion of each said mounting flange further having lateral portions formed integrally therewith providing inwardly facing dual axially oriented surfaces, whereby, said rim is seated on, and thereafter locked on, said spoke members by tightening of said fastening means and the mating engagement of said dual axially oriented and radially inclined surfaces on each said spoke felloe with said dual axially oriented and radially inclined surfaces on each said rim mounting flange, and by the mating engagement of said radially directed surface on each said spoke felloe with said terminal portion of each said rim mounting flange.

* * * * *

UNITED STATES PATENT OFFICE
CERTIFICATE OF CORRECTION

Patent No. 4,129,336                  Dated December 12, 1978

Inventor(s) William D. Walther

It is certified that error appears in the above-identified patent and that said Letters Patent are hereby corrected as shown below:

Col. 1, line 60, "operations" should read --operators--.

Col. 3, line 3, "spaced-outer" should read --spaced-apart--.

Col. 5, line 24, "or a felloe" should read --on a felloe--;
    line 31, "Fig. 3, 8 and 11" should read --Figs. 3 and 8--.

Col. 6, line 10, "of fastening means" should read --or fastening means--.

Col. 7, line 49, "each of said" should read --each said--.

Col. 10, line 8, "beam flanges" should read --bead flanges--;
    line 12, "axial projecting" should read --axially projecting--.

Signed and Sealed this

Seventeenth Day of April 1979

[SEAL]

Attest:

RUTH C. MASON
*Attesting Officer*

DONALD W. BANNER
*Commissioner of Patents and Trademarks*